United States Patent
Ryu et al.

(10) Patent No.: US 9,924,097 B2
(45) Date of Patent: Mar. 20, 2018

(54) APPARATUS, METHOD AND RECORDING MEDIUM FOR IMAGE STABILIZATION

(71) Applicant: Hanwha Techwin Co., Ltd., Changwon-si (KR)

(72) Inventors: Yeongeol Ryu, Changwon-si (KR); Sangji Park, Changwon-si (KR); Junho Cha, Changwon-si (KR); Seungin Noh, Changwon-si (KR)

(73) Assignee: Hanwha Techwin Co., Ltd., Suwon-Si (KR)

( * ) Notice: Subject to any disclaimer, the term of this patent is extended or adjusted under 35 U.S.C. 154(b) by 37 days.

(21) Appl. No.: 15/065,113

(22) Filed: Mar. 9, 2016

(65) Prior Publication Data

US 2017/0078575 A1  Mar. 16, 2017

(30) Foreign Application Priority Data

Sep. 16, 2015 (KR) .................. 10-2015-0131057

(51) Int. Cl.
| | |
|---|---|
| *H04N 5/232* | (2006.01) |
| *G06T 5/00* | (2006.01) |
| *G06T 5/50* | (2006.01) |
| *G06T 7/277* | (2017.01) |

(52) U.S. Cl.
CPC ......... *H04N 5/23254* (2013.01); *G06T 5/003* (2013.01); *G06T 5/50* (2013.01); *G06T 7/277* (2017.01); *H04N 5/23267* (2013.01); *G06T 2207/10016* (2013.01); *G06T 2207/20201* (2013.01)

(58) Field of Classification Search
CPC .......... H04N 5/23254; H04N 5/23261; H04N 5/23267; G06T 7/277; G06T 5/003; G06T 5/50
USPC ................................ 348/208.1, 208.3, 208.4
See application file for complete search history.

(56) References Cited

U.S. PATENT DOCUMENTS

| | | | |
|---|---|---|---|
| 2007/0002146 A1* | 1/2007 | Tico | H04N 5/23254 |
| | | | 348/208.1 |
| 2008/0246848 A1* | 10/2008 | Tsubaki | H04N 5/23264 |
| | | | 348/208.4 |
| 2009/0132164 A1 | 5/2009 | Goodall et al. | |
| 2013/0188069 A1* | 7/2013 | Sendik | H04N 5/3532 |
| | | | 348/222.1 |
| 2015/0008294 A1 | 1/2015 | Desbordes et al. | |
| 2015/0256755 A1* | 9/2015 | Wu | H04N 5/23267 |
| | | | 348/208.6 |

FOREIGN PATENT DOCUMENTS

| | | |
|---|---|---|
| JP | 2001-264106 A | 9/2001 |
| JP | 2014-522495 A | 9/2014 |

* cited by examiner

*Primary Examiner* — Nhan T Tran
(74) *Attorney, Agent, or Firm* — Sughrue Mion, PLLC (57) ABSTRACT

An apparatus, a method, and a recording medium for image stabilization are provided. The image stabilization method includes receiving an image that is captured by a camera, detecting a motion of the image, predicting a motion of the image, using a Kalman filter, comparing the detected motion with the predicted motion, and updating a parameter of the Kalman filter based on a result of the comparing.

17 Claims, 7 Drawing Sheets

APPARATUS, METHOD AND RECORDING MEDIUM FOR IMAGE STABILIZATION

CROSS-REFERENCE TO RELATED APPLICATION

This application claims priority from Korean Patent Application No. 10-2015-0131057, filed on Sep. 16, 2015, in the Korean Intellectual Property Office, the disclosure of which is incorporated herein by reference in its entirety.

BACKGROUND

1. Field

Apparatuses and methods consistent with exemplary embodiments relate to a method, an apparatus, and a recording medium for image stabilization.

2. Description of the Related Art

As an increasing number of people use multimedia devices, demand for image enhancement technology used for digital images captured in various environments is also increasing. The image enhancement technology includes blurring removal, noise removal, image stabilization, and the like, and is widely applied to digital cameras, smart phones, cameras or camcorders for family use, surveillance cameras for industrial use, broadcasting cameras, and image capturing devices such as those for military use. Initially developed image capturing devices produced an image by digitizing an analog image. However, recent image capturing devices produce a high-definition digital image that depicts a subject more clearly than an analog image based on various preprocessing and post processing technologies.

Among digital image correction technologies, image stabilization technology is most commonly used. When a user captures an image while holding an image capturing device or while the user moves to another place, the image capturing device may be shaken. In the case of a camera installed in transportation modes such as a vehicle, an airplane, or a helicopter, the camera may be unintentionally shaken due to many environmental factors such as a mechanical oscillation or friction with the ground. In addition, as a magnification of a zoom lens increases, a screen is severely shaken even though the image capturing device is slightly moved. The image stabilization technology is used to acquire a clear and sharp image even when the image capturing device is shaken while capturing an image, and is applied to remove unwanted effects due to the shaking that are found in the captured image.

Recently, digital image stabilization technology is used to correct shake effects by detecting unwanted shake effects through motion prediction between frames based on input image signals and reading, from a frame memory or a charge-coupled device (CCD), image data of which motions are corrected. Because the digital image stabilization technology may be lower in cost, may have higher accuracy than a mechanical stabilization method, and also compensates for various motion components that cannot be compensated through the mechanical stabilization method, research into the digital image stabilization technology is being actively conducted.

A Kalman filter is a recursive filter that traces a state of signals including noise and is developed by Rudolf Kalman. The Kalman filter is used in various fields such as computer vision, robotics, radar, and the like, and efficiently operates in most cases.

The Kalman filter recursively operates. The Kalman filter is used to estimate a current value based on a value that is estimated immediately before the current value and excludes estimated values and measurement values, other than the value that is estimated immediately before the current value.

An algorithm using the Kalman filter may be divided into two processes: a prediction process and an update (correction) process. First, the prediction process for calculating a state following a state that is previously predicted is performed. Then, the update (correction) process, which is for recursively correcting a calculated prediction state based on an error between the calculated prediction state and an actually measured state and helping more accurately predict a next state, is performed.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a method, an apparatus, and a recording medium for image stabilization that use an adaptive Kalman filter.

According to an aspect of an exemplary embodiment, there is provided an image stabilization method that is performed by an image stabilization apparatus, the method including receiving an image that is captured by a camera, detecting a motion of the image, predicting a motion of the image, using a Kalman filter, comparing the detected motion with the predicted motion, and updating a parameter of the Kalman filter based on a result of the comparing.

The method may further include determining an unintentional motion of the image based on a difference between the detected motion and the predicted motion, and compensating for the unintentional motion.

The updating the parameter may include increasing a measurement noise variance of the Kalman filter in response to the predicted motion having a fluctuation section having an amplitude greater than or equal to a threshold value.

The updating the parameter may include decreasing a measurement noise variance of the Kalman filter in response to a difference between the detected motion and the predicted motion being greater than or equal to a threshold value.

The method may further include correcting the predicted motion based on the predicted motion and the detected motion.

The image may be a current frame, and the method may further include predicting a motion of a frame next to the current frame based on the corrected predicted motion of the current frame.

The motion may be predicted based on an equation $$\begin{cases} \hat{X}_t^- = A\hat{X}_{t-1} \\ P_t^- = AP_{t-1}A^T + S_w \end{cases},$$

and $\hat{X}_t^-$ may be a motion that is predicted from a current frame, $\hat{X}_{t-1}$ may be a value of correcting a motion that is predicted from a previous frame, A may be a state transition matrix, $P_t^-$ may be an error variance regarding the predicted motion $\hat{X}_t^-$, $P_{t-1}$ may be an error variance regarding the value $\hat{X}_{t-1}$, and $S_w$ may be a process noise variance.

The predicted motion may be corrected based on an equation $$\begin{cases} K_t = P_t^- C^T (CP_t^- C^T + S_z)^{-1} \\ \hat{X}_t = \hat{X}_t^- + K_t(y_t - C\hat{X}_t^-) \\ P_t = (I_2 - K_t)P_t^- \end{cases},$$

and $K_t$ may be a gain of the Kalman filter, C may be an observation model matrix, $S_z$ may be a measurement noise variance of the Kalman filter, $\hat{X}_t$ may be a value of correcting a motion $\hat{X}_t^-$ that is predicted from a current frame, $y_t$ may be a motion that is detected from the current frame, and $P_t$ may be an error variance for the value $\hat{X}_t$.

The updating the parameter may include updating the measurement noise variance $S_z$.

A non-transitory computer-readable recording medium may store a program to cause a computer to perform the method.

According to an aspect of an exemplary embodiment, there is provided an image stabilization apparatus including an image receiver configured to receive an image that is captured by a camera. The image stabilization apparatus further includes at least one processor to implement an image corrector configured to detect a motion of the image, and predict a motion of the image, using a Kalman filter, and a parameter renewer configured to compare the detected motion with the predicted motion, and update a parameter of the Kalman filter based on a result of the comparison.

The image corrector may be further configured to determine an unintentional motion of the image based on a difference between the detected motion and the predicted motion, and compensate for the unintentional motion.

The parameter renewer may be further configured to increase a measurement noise variance of the Kalman filter in response to the predicted motion of the image having a fluctuation section having an amplitude greater than or equal to a threshold value.

The parameter renewer may be further configured to decrease a measurement noise variance of the Kalman filter in response to a difference between the detected motion and the predicted motion being greater than or equal to a threshold value.

The image corrector may be further configured to correct the predicted motion based on the predicted motion and the detected motion.

The image may be a current frame, and the image corrector may be further configured to predict a motion of a frame next to the current frame based on the corrected predicted motion of the current frame.

The motion may be predicted based on an equation $$\begin{cases} \hat{X}_t^- = A\hat{X}_{t-1} \\ P_t^- = AP_{t-1}A^T + S_w \end{cases},$$

and $\hat{X}_t^-$ may be a motion that is predicted from a current frame, $\hat{X}_{t-1}$ may be a value of correcting a motion that is predicted from a previous frame, A may be a state transition matrix, $P_t^-$ may be an error variance for the predicted motion $\hat{X}_t^-$, $P_{t-1}$ may be an error variance for the value $\hat{X}_{t-1}$, and $S_w$ may be a process noise variance.

The predicted motion may be corrected based on an equation $$\begin{cases} K_t = P_t^- C^T (CP_t^- C^T + S_z)^{-1} \\ \hat{X}_t = \hat{X}_t^- + K_t(y_t - C\hat{X}_t^-) \\ P_t = (I_2 - K_t)P_t^- \end{cases},$$

and $K_t$ may be a gain of the Kalman filter, C may be an observation model matrix, $S_z$ may be a measurement noise variance of the Kalman filter, $\hat{X}_t$ may be a value of correcting a motion $\hat{X}_t^-$ that is predicted from a current frame, $y_t$ may be a motion that is detected from the current frame, and $P_t$ may be an error variance for the value $\hat{X}_t$.

The parameter renewer may be further configured to update the measurement noise variance $S_z$.

BRIEF DESCRIPTION OF THE DRAWINGS

The above and/or other aspects will be more apparent by describing exemplary embodiments with reference to the accompanying drawings, in which.

DETAILED DESCRIPTION

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that although the terms "first", "second", etc. may be used herein to describe various components, these components may not be limited by these terms. These components are only used to distinguish one component from another.

As used herein, the singular forms "a", "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

Sizes of components in the drawings may be exaggerated for convenience of explanation. In other words, because sizes and thicknesses of components in the drawings are arbitrarily illustrated for convenience of explanation, the following exemplary embodiments are not limited thereto.

When an exemplary embodiment may be implemented differently, a process order may be performed differently from the described order. For example, two consecutively described processes may be performed substantially at the same time or performed in an order opposite to the described order.

In addition, the terms such as "unit," "-er (-or)," and "module" described in the specification refer to an element for performing at least one function or operation, and may be implemented in hardware, software, or the combination of hardware and software.

Figure 1:
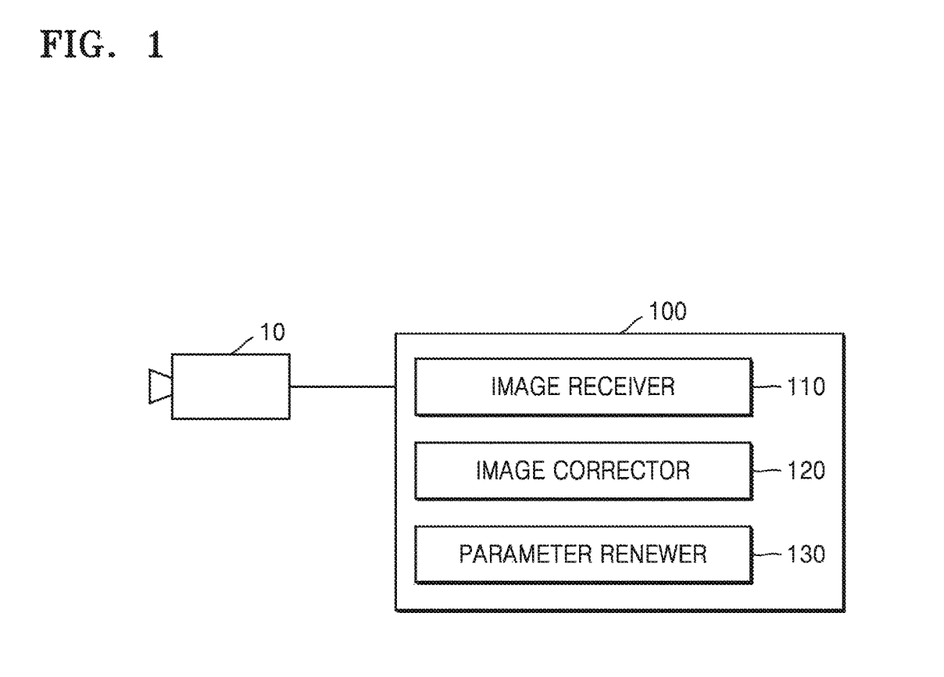
FIG. 1 is a diagram of an image system according to an exemplary embodiment.

FIG. 1 is a diagram of an image system according to an exemplary embodiment.

Referring to FIG. 1, the image system includes a camera 10 and an image stabilization apparatus 100 for stabilizing an image captured by the camera 10.

The camera 10 captures a subject and outputs an image. For example, the camera 10 may be a camera for capturing an image by using a complementary metal-oxide semiconductor CMOS or a charge coupled device (CCD). An image of the subject is provided to the CMOS or CCD through a lens, and the CMOS or CCD converts an optical signal of the subject that passes through the lens into an electrical signal (a capturing signal) and outputs the electrical signal.

However, exemplary embodiments are not limited thereto. The camera 10 may be a thermo camera for detecting a temperature difference between an object and a background around the object based on radiation energy emitted from the object, converting the detected temperature difference into an electrical signal, and processing the electrical signal as an image.

The camera 10 may operate (e.g., displacement, rotation, zoom, etc.) by the control of a controller or an administrator, and accordingly, an area captured by the camera 10 may be deliberately changed. Unintentional motions that are not desired may be made due to external factors such as shaking. When the camera 10 captures a moving image including continuous frames, the unintentional motions may be presented as shake effects or blurring in the image.

The image stabilization apparatus 100 receives an image from the camera 10 and corrects the image to remove the shake effects or blurring from the image, thereby outputting a stabilized image. The image stabilization apparatus 100 renews a parameter used to correct the image in real time and performs adaptive image stabilization.

The image stabilization apparatus 100 of FIG. 1 only includes components regarding an exemplary embodiment to prevent confusion with respect to features of exemplary embodiments. Therefore, the image stabilization apparatus 100 of FIG. 1 may further include other general-use components in addition to the components shown in FIG. 1.

The image stabilization apparatus 100 may be at least one processor or may include at least one processor. Accordingly, the image stabilization apparatus 100 may be included in other hardware devices such as a microprocessor or a general-use computer system.

The image stabilization apparatus 100 may be a processor included in the camera 10 or may be included in a separate device for receiving an image via a wireless/wired network.

Referring to FIG. 1, the image stabilization apparatus 100 includes an image receiver 110, an image corrector 120, and a parameter renewer 130.

The image receiver 110 receives an image captured by the camera 10. The image may be a moving image including continuous frames.

The image corrector 120 detects a motion of the image, corrects the detected motion by using a Kalman filter, and corrects the image based on the corrected motion. For example, the image corrector 120 detects a motion of a current frame of an image, corrects the detected motion by using the Kalman filter, and corrects the current frame of the image based on the corrected motion.

The image motion detected from the image may include an intentional motion (e.g., rotation, displacement, zooming, etc.) that occurs during operation of the camera 10 as well as an unintentional motion such as shaking of the camera 10 or blurring in the image that is caused by an external factor.

The image corrector 120 predicts a motion of the image by using the Kalman filter besides directly detecting a motion from the image. In detail, an image motion may be predicted in a current frame of the image based on the image motion that is predicted in a previous frame by using the Kalman filter. Motion prediction of the image by using the Kalman filter may use a prediction value of a previous frame and thus may use an initial value (i.e., a prediction value of a first frame of the image). The initial value may be set based on a prediction function and a motion detected from the first frame of the image. It is assumed that the motion of the image that is predicted by using the Kalman filter only includes an intentional motion.

The image corrector 120 detects an unintentional motion existing in the image based on a motion that is directly detected from the image and a motion of the image that is predicted by using the Kalman filter. In detail, the image corrector 120 detects an unintentional motion from a current frame of the image based on a motion that is detected from the current frame of the image and a motion that is predicted in the current frame by using the Kalman filter.

The image corrector 120 detects an unintentional motion existing in the image based on a difference between an image motion detected from the image and an image motion predicted by using the Kalman filter. In detail, the image corrector 120 performs an operation of subtracting the image predicted by using the Kalman filter from the image motion detected from the image. According to the subtraction, the image motion that is directly detected from the image includes an intentional motion as well as an unintentional motion. However, if the image motion predicted by using the Kalman filter (it is assumed that the image motion predicted by using the Kalman filter only includes an intentional motion) is subtracted from the image motion that is directly detected from the image, the unintentional motion may be detected.

The image corrector 120 corrects the image by using the unintentional motion that is detected through the subtraction. For example, the image corrector 120 compensates for the unintentional motion existing in the image by applying an inverse matrix or an inverse vector of the unintentional motion to the image.

The image corrector 120 may further correct the image and may finally output a stabilized image.

An operation of predicting the image motion by using the Kalman filter, which is performed by the image corrector 120, includes a prediction process and a correction process. The prediction process is to predict an image motion in a current frame first by using a value of an image motion predicted in a previous frame, and the correction process is to correct the image motion that is predicted first to acquire an image motion that may be secondarily predicted. A purpose of secondarily predicting an image motion is to improve performance of an image motion prediction in a next frame, and the image motion that is secondarily predicted is used to predict an image motion in the next frame.

The image corrector 120 predicts an image motion of a current frame of the image first based on Equation 1 below.

$$\begin{cases} \hat{X}_t^- = A\hat{X}_{t-1} \\ P_t^- = AP_{t-1}A^T + S_w \end{cases} \quad \text{[Equation 1]}$$

In Equation 1, $\hat{X}_t^-$ is an image motion of a current frame of an image that is predicted first, $\hat{X}_{t-1}$ is an image motion of a previous frame of the image that is secondarily predicted, A is a state transition matrix, $P_t^-$ is an error variance for $\hat{X}_t^-$, $P_{t-1}$ is an error variance for $\hat{X}_{t-1}$, and $S_w$ is a process noise variance.

Then, the image corrector 120 secondarily predicts, based on Equation 2, an image motion of the current frame by correcting $\hat{X}_t^-$ and $P_t^-$ that are predicted first based on Equation 1.

$$\begin{cases} K_t = P_t^- C^T (CP_t^- C^T + S_z)^{-1} \\ \hat{X}_t = \hat{X}_t^- + K_t(y_t - C\hat{X}_t^-) \\ P_t = (I_2 - K_t)P_t^- \end{cases} \quad \text{[Equation 2]}$$

In Equation 2, $K_t$ is a gain of the Kalman filter, C is an observation model matrix, $S_z$ is a measurement noise variance, $\hat{X}_t$ is an image motion that is predicted secondarily by correcting the image motion $\hat{X}_t^-$ in the current frame that is predicted first, $y_t$ is an image motion that is actually detected from the current frame, and $P_t$ is an error variance for $\hat{X}_t$.

An initial value of the Kalman filter may be acquired from Equation 3 below.

$$\begin{cases} \hat{X}_0 = E(X_0) \\ P_0 = E[(X_0 - \hat{X}_0)(X_0 - \hat{X}_0)^T] \end{cases} \quad \text{[Equation 3]}$$

In Equation 3, $\hat{X}_0$ is a prediction value of a first frame of the image, $X_0$ is an actual initial value of an intentional image motion of the first frame, $P_0$ is an error variance for $\hat{X}_0$, and E( ) is a prediction function.

The parameter $S_z$ in Equation 2 is a constant set by a user. As the parameter $S_z$ decreases, an output signal of the Kalman filter (an image motion prediction value of the current frame) is close to an input signal of the Kalman filter (a corrected value of an image motion prediction value of the previous frame), but the output signal may include noise. On the contrary, as the parameter $S_z$ is great, an output may be smooth, but over-smoothing may occur.

That is, the user may set the parameter $S_z$ by considering a shaking circumstance, but if the user uses the parameter $S_z$ that is fixed, the user may not take any action when shaking occurring in the camera 10 is variable.

Figure 2:
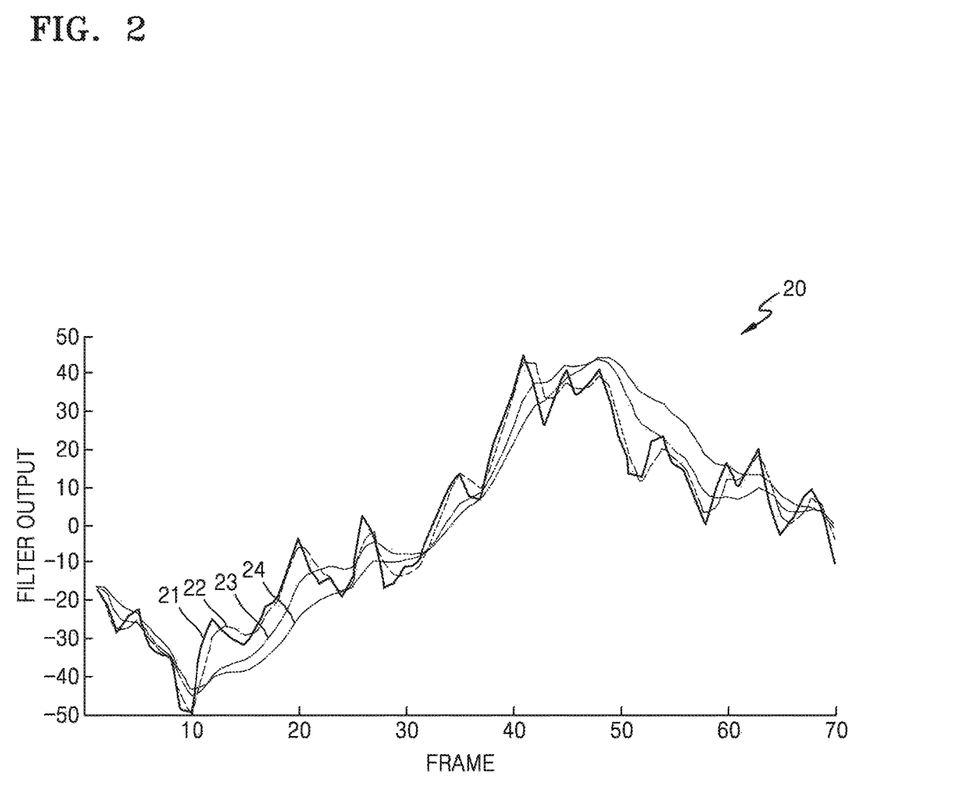
FIG. 2 is a graph of an output value of a Kalman filter according to a setting of a parameter of the Kalman filter, according to an exemplary embodiment.

FIG. 2 is a graph 20 of an output value of a Kalman filter according to a setting of a parameter $S_z$ of the Kalman filter, according to an exemplary embodiment.

A graph 21 of FIG. 2 indicates a value of an image motion that is actually measured, a graph 22 indicates an output value of the Kalman filter when the parameter $S_z$ is 2, and a graph 23 indicates an output value of the Kalman filter when the parameter $S_z$ is 20. A graph 24 indicates an output value of the Kalman filter when the parameter $S_z$ is 50.

Referring to the graph 20 of FIG. 2, as the value of the parameter $S_z$ is small, the output value of the Kalman filter is close to an actual measurement value, and as the value of the parameter $S_z$ is great, the output value rarely changes, and thus, the output value is smoother than the actual measurement value.

Referring back to FIG. 1, the parameter renewer 130 renews a parameter of the Kalman filter based on a result of comparing an image motion that is detected by the image corrector 120 and an image motion predicted by using the Kalman filter.

For example, the parameter renewer 130 renews the parameter $S_z$ in Equation 2 based on the result of comparing the image motion that is detected by the image corrector 120 and the image motion predicted by using the Kalman filter.

For example, the parameter renewer 130 increases the parameter $S_z$ of the Kalman filter, that is, a measurement noise variance, when the image motion predicted by using the Kalman filter includes a fluctuation section having an amplitude that is greater than or equal to a threshold value.

As another example, the parameter renewer 130 decrease the parameter $S_z$ of the Kalman filter, that is, a measurement noise variance, when a difference between an image motion that is actually measured and an image motion predicted by using the Kalman filter is greater than or equal to a threshold value.

Figure 3:
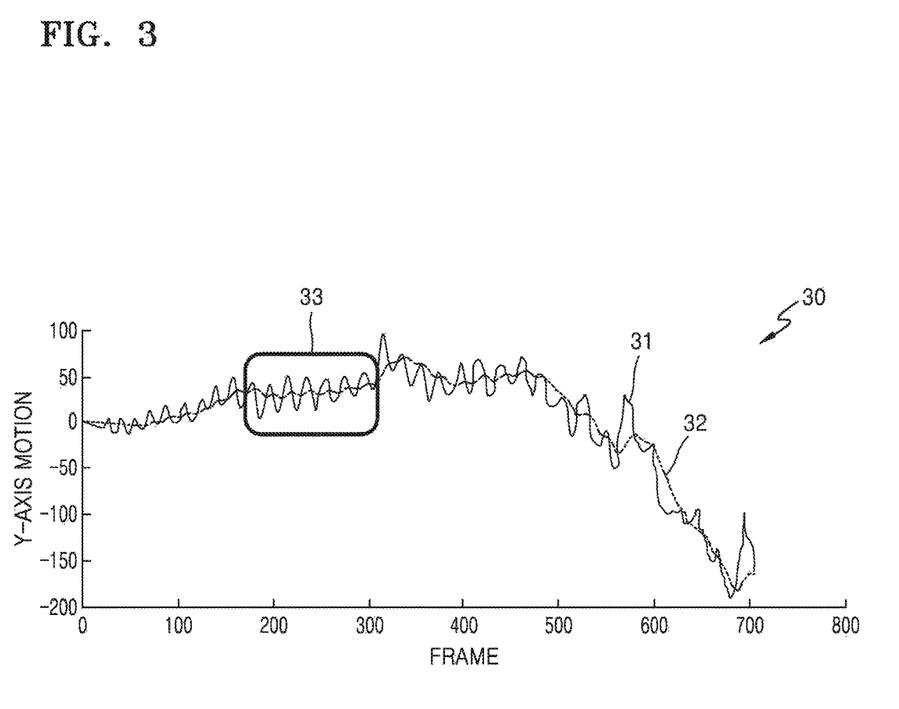
FIGS. 3 and 4 are graphs of output values of a Kalman filter, according to exemplary embodiments.
Figure 4:
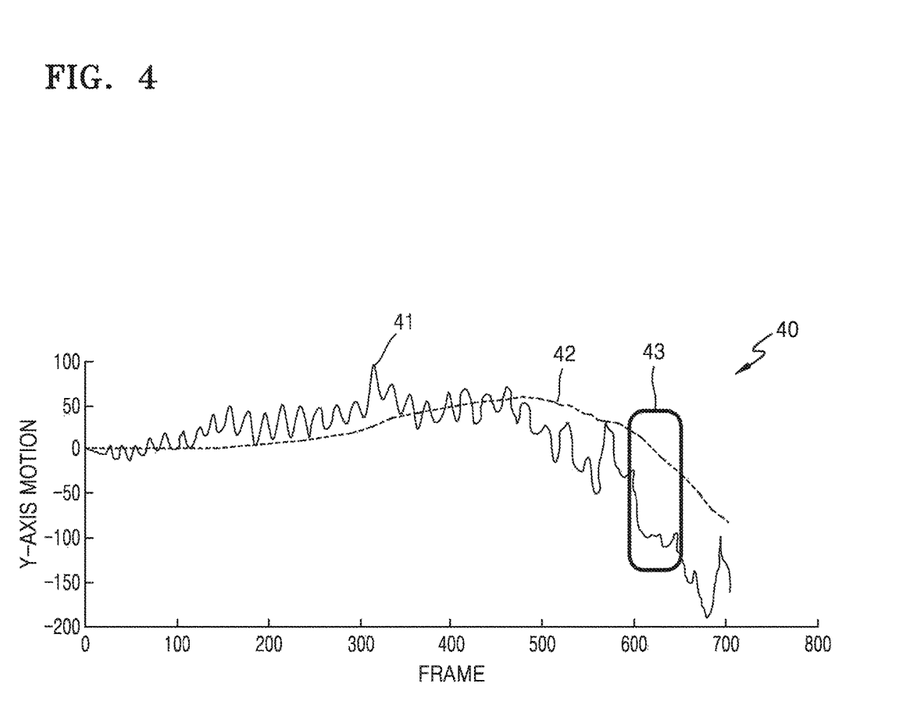

FIGS. 3 and 4 are graphs of output values of a Kalman filter, according to exemplary embodiments. FIG. 3 is a graph 30 of an output value of a Kalman filter, according to an exemplary embodiment.

A graph 31 of FIG. 3 indicates a y-axis motion of an image that is actually measured, and a graph 32 indicates the output value of the Kalman filter, that is, a y-axis motion of the image that is predicted by using the Kalman filter.

The graph 31 includes both an intentional motion and an unintentional motion. It is considered that an unintentional motion, in which the image is unstably shaken, exists in a fluctuation section 33 of the graph 31 where fluctuation occurs during extremely short intervals. The image is stabilized under the assumption that the output value of the Kalman filter includes intentional motions, and thus, if the output value of the Kalman filter has a fluctuation section, it may be considered that image motion prediction using the Kalman filter is not properly performed.

Referring to the fluctuation section 33 of FIG. 3, the graph 31 indicating the image motion that is actually measured as well as the graph 32 indicating the output value of the Kalman filter include fluctuation that is predicted as an unintentional motion.

To adjust the output value of the Kalman filter to be smoother than that of a Kalman filter of FIG. 3 to remove the unintentional motion that remains in the output value of the Kalman filter, the parameter renewer 130 of FIG. 1 may increase the parameter $S_z$ in Equation 2. For example, the parameter renewer 130 may increase the parameter by multiplying the parameter and a constant that is greater than 1.

The parameter renewer 130 may distinguish a fluctuation section having an amplitude that is greater than or equal to a threshold value from the output value of the Kalman filter. The parameter renewer 130 may add, to conditions of the fluctuation section, a condition that an output value fluctuates at a frequency that is greater than or equal to a threshold value.

The parameter renewer 130 may distinguish the fluctuation section by using a slope of the output value of the Kalman filter. For example, the parameter renewer 130 may determine that the fluctuation exists when the slope of the output value of the Kalman filter repeatedly has positive and negative values, and an absolute value is greater than a threshold value. When an image motion that is predicted by using the Kalman filter includes the fluctuation section, the parameter renewer 130 may increase the parameter $S_z$ in Equation 2. For example, the parameter renewer 130 of FIG. 1 may increase the parameter S by multiplying the parameter $S_z$ and a constant that is greater than 1.

FIG. 4 is a graph 40 of an output value of a Kalman filter, according to another exemplary embodiment.

A graph 41 of FIG. 4 indicates a y-axis motion of an image that is actually measured, and a graph 42 indicates the output value of the Kalman filter, that is, a y-axis motion of the image that is predicted by using the Kalman filter.

Referring to FIG. 4, the graph 42 indicating the output value of the Kalman filter may not include an element, which is considered to be an unintentional motion in the graph 41 indicating the image motion that is actually measured, but may include an element that is slightly identical to a component corresponding to an intentional motion in the graph 41. Then, it is considered that performance of the Kalman filter is good.

If the Kalman filter performs excessively smooth filtering, over-smoothing occurs as shown in a section 43, and thus the graph 42 may not properly indicate a large change in values of the image motion that is actually measured. If a value of the graph 42 is greatly different from a value of the graph 41, it is deemed that image motion prediction using the Kalman filter is not properly performed.

Therefore, the parameter renewer 130 of FIG. 1 may decrease the parameter $S_z$ in Equation 2 in such a manner that the output value of the Kalman filter is close to the image motion that is actually measured. For example, the parameter renewer 130 may decrease the parameter $S_z$ by multiplying a constant smaller than 1 and the parameter $S_z$.

The parameter renewer 130 may decrease the parameter $S_z$ when a difference between an image motion actually measured, and an image motion predicted by using the Kalman filter is greater than or equal to a threshold value.

Figure 5:
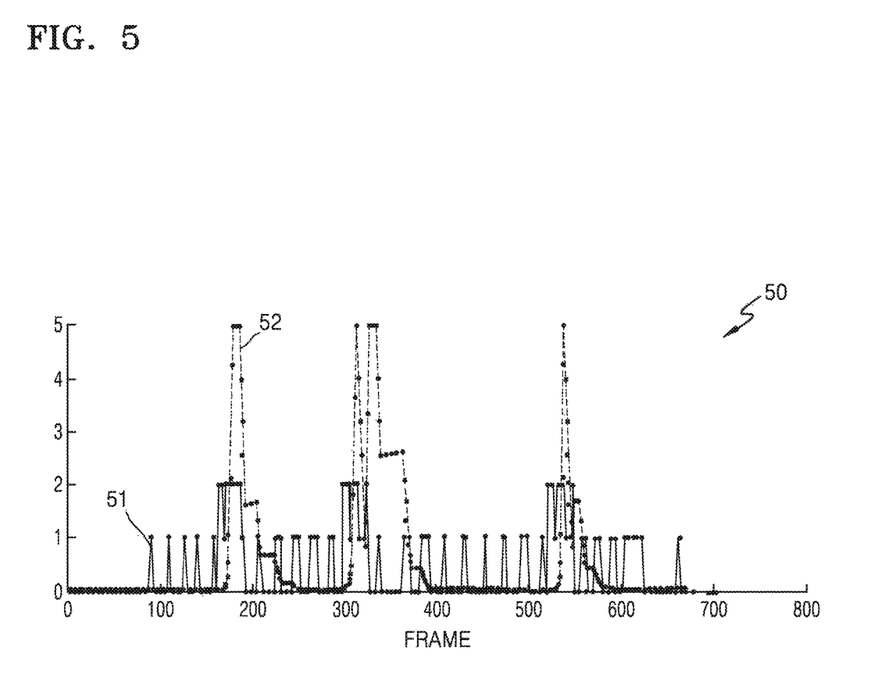
FIG. 5 is a graph of setting a parameter according to a state of an output value of a Kalman filter, according to an exemplary embodiment.

FIG. 5 is a graph 50 of setting a parameter according to a state of an output value of a Kalman filter, according to an exemplary embodiment.

A vertical axis of FIG. 5 indicates a state value of a graph 51 that indicates a state of the output value of the Kalman filter. A frame in which a value of the graph 51 is 1 is a frame in which over-smoothing occurs, and a frame in which a value of the graph 51 is 2 is a frame in which fluctuation occurs.

The graph 52 indicates an example of values of the parameter $S_z$ in Equation 2 that is adjusted by the parameter renewer 130, depending on the state of the output value of the Kalman filter.

Referring to the graph 50, when over-smoothing occurs in a frame, the parameter $S_z$ in a next frame decreases, and when fluctuation occurs in a frame, the parameter $S_z$ in a next frame increases.

Figure 6:
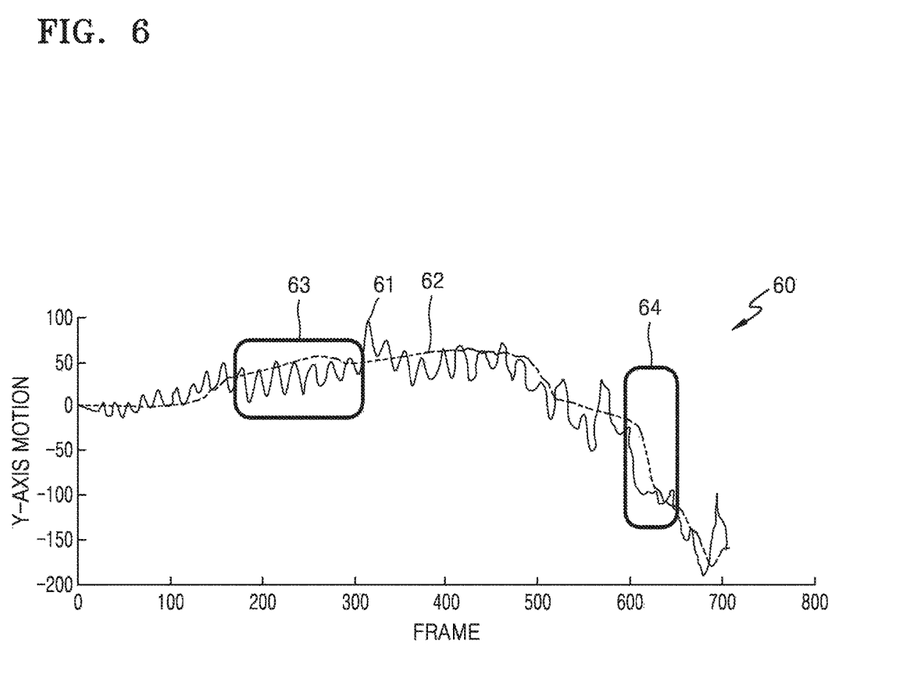
FIG. 6 is a graph of an output value of a Kalman filter when a parameter of the Kalman filter is adjusted, according to an exemplary embodiment.

FIG. 6 is a graph 60 of an output value of a Kalman filter when a parameter $S_z$ of the Kalman filter in Equation 2 is variably adjusted by the parameter renewer 130, according to an exemplary embodiment.

A graph 61 of FIG. 6 indicates a y-axis motion of the image that is actually measured, and a graph 62 indicates the output value of the Kalman filter, that is, a y-axis motion of the image that is predicted by using the Kalman filter. In this case, the parameter $S_z$ of the Kalman filter is adjusted by the parameter renewer 130 according to a state of the output value of the Kalman filter.

As the parameter $S_z$ is adjusted, fluctuation of the graph 62 is removed from a section 63 where the fluctuation exists, and over-smoothing is removed from a section 64 where over-smoothing occurs.

During the calculation performed by the image stabilization apparatus 100 of FIG. 1, a two-dimensional (2D) model may be used. However, when an image captured by the camera 10 is a 3D image, the image stabilization apparatus 100 may use a 3D model. Also, the calculation performed by the image stabilization apparatus 100 may be performed for each frame of the image.

Figure 7:
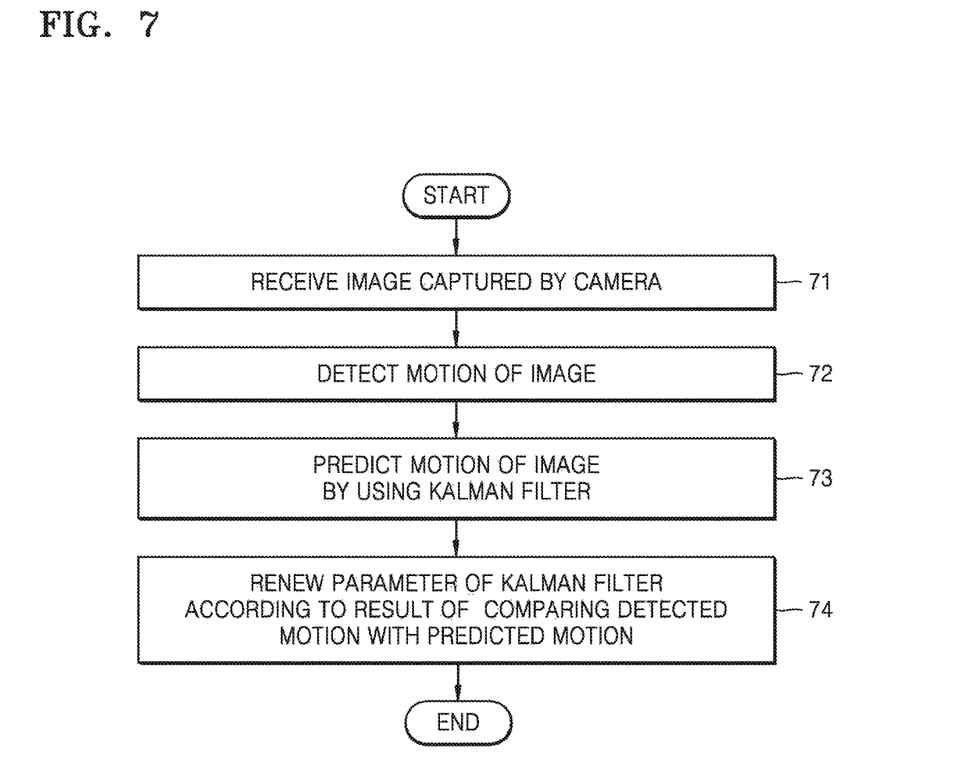
FIG. 7 is a flowchart of an image stabilization method according to an exemplary embodiment.

FIG. 7 is a flowchart of an image stabilization method according to an exemplary embodiment.

The flowchart of FIG. 7 includes the processes performed by the image stabilization apparatus 100 of FIG. 1. Therefore, the descriptions regarding the components of FIG. 1 that are provided with reference to FIGS. 1 to 6 may be applied to the flowchart of FIG. 7.

Referring to FIG. 7, in operation 71, the image receiver 110 of FIG. 1 receives an image captured by a camera.

In operation 72, the image corrector 120 of FIG. 1 detects a motion of the image received in operation 71. The image corrector 120 detects a motion of a current frame of the image.

In operation 73, the image corrector 120 predicts a motion of the image by using a Kalman filter. The image corrector 120 predicts a motion of the current frame of the image. During the prediction performed in operation 73, a value of a motion of a previous frame of the image that is predicted by using the Kalman filter is used. In detail, a value, which is produced by correcting the value of the motion of the previous frame that is predicted by using the Kalman filter based on a value of a detected motion of the previous frame, is used for prediction performed in operation 73.

In operation 74, the parameter renewer 130 of FIG. 1 renews a parameter of the Kalman filter based on a result of comparing the image motion detected in operation 72 with the image motion predicted in operation 73.

The image corrector 120 of FIG. 1 may correct the image motion predicted in operation 73 by using the image motion detected in 72, and may use the corrected image motion to predict an image motion of a next frame. The correction is performed after operation 73 and may be performed before or after operation 74.

The method, apparatus, and non-transitory computer-readable recording medium for image stabilization according to the one or more exemplary embodiments may provide good image stabilization performance in environments that variously change, by adaptively applying parameters of a Kalman filter used to stabilize images.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

At least one of the components, elements, modules or units represented by a block as illustrated in FIG. 1 (e.g., the image receiver 110, the image corrector 120, the parameter renewer 130, etc.) may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit performing all operations or functions of the combined two or more components, elements, modules or units. Also, at least part of functions of at least one of these components, elements, modules or units may be performed by another of these components, elements, modules or units. Further, communication between the components, elements, modules or units may be performed through a bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image stabilization method that is performed by an image stabilization apparatus, the method comprising:
   receiving an image that is captured by a camera;
   detecting a motion of the image;
   predicting a motion of the image, using a Kalman filter; and
   increasing a measurement noise variance of the Kalman filter in response to the predicted motion having a fluctuation section, in which an amplitude of the predicted motion is greater than or equal to a first threshold value and the predicted motion fluctuates at a frequency that is greater than or equal to a second threshold.

2. The method of claim 1, further comprising:
   determining an unintentional motion of the image by subtracting the predicted motion from the detected motion; and
   compensating for the unintentional motion.

3. The method of claim 1, wherein the updating the parameter comprising, in response to a difference between the detected motion and the predicted motion being greater than or equal to a third threshold value, determining that over-smoothing occurs and decreasing the measurement noise variance of the Kalman filter to remove an effect of the over-smoothing.

4. The method of claim 1, further comprising correcting the predicted motion based on the predicted motion and the detected motion.

5. The method of claim 4, wherein the image is a current frame, and
   the method further comprises predicting a motion of a frame next to the current frame based on the corrected predicted motion of the current frame.

6. A non-transitory computer-readable recording medium storing a program to cause a computer to perform the method of claim 1.

7. An image stabilization method that is performed by an image stabilization apparatus, the method comprising:
   receiving an image that is captured by a camera;
   detecting a motion of the image;
   predicting a motion of the image, using a Kalman filter;
   comparing the detected motion with the predicted motion;
   updating a parameter of the Kalman filter based on a result of the comparing; and
   correcting the predicted motion based on the predicted motion and the detected motion,
   wherein the motion is predicted based on an equation:

$$\begin{cases} \hat{X}_t^- = A\hat{X}_{t-1} \\ P_t^- = AP_{t-1}A^T + S_w \end{cases},$$

wherein $\hat{X}_t^-$ is a motion that is predicted from a current frame, $\hat{X}_{t-1}$ is a value of correcting a motion that is predicted from a previous frame, A is a state transition matrix, $P_t^-$ is an error variance regarding the predicted motion $\hat{X}_t^-$, $P_{t-1}$, is an error variance regarding the value $\hat{X}_{t-1}$, and $S_w$ is a process noise variance.

8. An image stabilization method that is performed by an image stabilization apparatus, the method comprising:
   receiving an image that is captured by a camera;
   detecting a motion of the image;
   predicting a motion of the image, using a Kalman filter;
   comparing the detected motion with the predicted motion;
   updating a parameter of the Kalman filter based on a result of the comparing; and
   correcting the predicted motion based on the predicted motion and the detected motion,
   wherein the predicted motion is corrected based on an equation:

$$\begin{cases} K_t = P_t^- C^T (CP_t^- C^T + S_z)^{-1} \\ \hat{X}_t = \hat{X}_t^- + K_t(y_t - C\hat{X}_t^-) \\ P_t = (I_2 - K_t)P_t^- \end{cases},$$

wherein $k_t$ is a gain of the Kalman filter, C is an observation model matrix, $S_z$ is the measurement noise variance of the Kalman filter, $\hat{X}_t$ is a value of correcting a motion $\hat{X}_t^-$ that is predicted from a current frame, $y_t$ is a motion that is detected from the current frame, and $P_t$ is an error variance for the value $\hat{X}_t$.

9. The method of claim 8, wherein the updating the parameter comprises updating the measurement noise variance $S_z$.

10. An image stabilization apparatus comprising:
an image receiver configured to receive an image that is captured by a camera; and
at least one processor to implement:
an image corrector configured to detect a motion of the image, and predict a motion of the image, using a Kalman filter; and
a parameter renewer configured to increase a measurement noise variance of the Kalman filter in response to the predicted motion having a fluctuation section, in which an amplitude of the predicted motion is greater than or equal to a first threshold value and the predicted motion fluctuates at a frequency that is greater than or equal to a second threshold.

11. The image stabilization apparatus of claim 10, wherein the image corrector is further configured to:
determine an unintentional motion of the image by subtracting the predicted motion from the detected motion; and
compensate for the unintentional motion.

12. The image stabilization apparatus of claim 10, wherein the parameter renewer is further configured to, in response to a difference between the detected motion and the predicted motion being greater than or equal to a third threshold value, determine that over-smoothing occurs and decrease the measurement noise variance of the Kalman filter to remove an effect of the over-smoothing.

13. The image stabilization apparatus of claim 10, wherein the image corrector is further configured to correct the predicted motion based on the predicted motion and the detected motion.

14. The image stabilization apparatus of claim 13, wherein the image is a current frame, and
the image corrector is further configured to predict a motion of a frame next to the current frame based on the corrected predicted motion of the current frame.

15. An image stabilization apparatus comprising:
an image receiver configured to receive an image that is captured by a camera; and
at least one processor to implement:
an image corrector configured to detect a motion of the image, and predict a motion of the image, using a Kalman filter; and
a parameter renewer configured to compare the detected motion with the predicted motion, and update a parameter of the Kalman filter based on a result of the comparison, and correct the predicted motion based on the predicted motion and the detected motion,
wherein the motion is predicted based on an equation:

$$\begin{cases} \hat{X}_t^- = A\hat{X}_{t-1} \\ P_t^- = AP_{t-1}A^T + S_w \end{cases},$$

wherein $\hat{X}_t^-$ is a motion that is predicted from a current frame, $\hat{X}_{t-1}$ is a value of correcting a motion that is predicted from a previous frame, A is a state transition matrix, $P_t^-$ is an error variance for the predicted motion $\hat{X}_t^-$, $P_{t-1}$ is an error variance for the value $\hat{X}_{t-1}$, and $S_w$ is a process noise variance.

16. An image stabilization apparatus comprising:
an image receiver configured to receive an image that is captured by a camera; and
at least one processor to implement:
an image corrector configured to detect a motion of the image, and predict a motion of the image, using a Kalman filter; and
a parameter renewer configured to compare the detected motion with the predicted motion, and update a parameter of the Kalman filter based on a result of the comparison, and correct the predicted motion based on the predicted motion and the detected motion,
wherein the predicted motion is corrected based on an equation:

$$\begin{cases} K_t = P_t^- C^T (C P_t^- C^T + S_z)^{-1} \\ \hat{X}_t = \hat{X}_t^- + K_t(y_t - C\hat{X}_t^-) \\ P_t = (I_2 - K_t)P_t^- \end{cases},$$

wherein $K_t$ is a gain of the Kalman filter, C is an observation model matrix, $S_z$ is a measurement noise variance of the Kalman filter, $\hat{X}_t$ is a value of correcting a motion $\hat{X}_t^-$ that is predicted from a current frame, $y_t$ is a motion that is detected from the current frame, and $P_t$ is an error variance for the value $\hat{X}_t$.

17. The image stabilization apparatus of claim 16, wherein the parameter renewer is further configured to update the measurement noise variance $S_z$.

* * * * *